United States Patent [19]

Oliver et al.

[11] Patent Number: 4,630,194
[45] Date of Patent: Dec. 16, 1986

[54] APPARATUS FOR EXPEDITING SUB-UNIT AND MEMORY COMMUNICATIONS IN A MICROPROCESSOR IMPLEMENTED DATA PROCESSING SYSTEM HAVING A MULTIBYTE SYSTEM BUS THAT UTILIZES A BUS COMMAND BYTE

[75] Inventors: Burton L. Oliver, Nanticoke; David C. Preston, Newark Valley, both of N.Y.

[73] Assignee: International Business Machines Corporation, Armonk, N.Y.

[21] Appl. No.: 500,501

[22] Filed: Jun. 2, 1983

[51] Int. Cl.[4] .............................................. G06F 9/00
[52] U.S. Cl. ...................................................... 364/200
[58] Field of Search ... 364/200 MS File, 900 MS File, 364/134

[56] References Cited

U.S. PATENT DOCUMENTS 4,340,933  7/1982  Miu et al. ............................ 364/200

Primary Examiner—Gareth D. Shaw
Assistant Examiner—John G. Mills
Attorney, Agent, or Firm—John H. Bouchard; Saul A. Seinberg

[57] ABSTRACT

Bus command generation apparatus is provided for a microprocessor implemented data processing system that uses a multibyte width system bus requiring a bus command byte since a complete bus command byte is ordinarily unavailable directly from a microprocessor. A bus command register is loaded with a preliminary bus command, certain bits of which are then modified in accordance with the operation to be performed. The limited command information available from the microprocessor that controls I/O operations is utilized to modify the preliminary bus command bytes without any need to access memory for bus command information. The bus command generation apparatus is adapted to pass a preliminary bus command byte unaltered, under predefined conditions, to the system bus.

8 Claims, 2 Drawing Figures

APPARATUS FOR EXPEDITING SUB-UNIT AND MEMORY COMMUNICATIONS IN A MICROPROCESSOR IMPLEMENTED DATA PROCESSING SYSTEM HAVING A MULTIBYTE SYSTEM BUS THAT UTILIZES A BUS COMMAND BYTE

BACKGROUND OF THE INVENTION

1. Field of the Invention

This invention is concerned with sub-unit and memory communications in a data processing system that uses a multibyte width system bus, which system is microprocessor implemented. More particularly, this invention is directed to improving the performance of such communications where the multibyte system bus is interfaced with the system under the control of a microprocessor having insufficient control information output lines to form a required command byte for the system bus in a single system cycle.

2. Description of the Prior Art

The emulation of "main frame" data processing systems through the use of microprocessors has become a reality. A typical main frame data processing system would be any one of the System 370 (S/370) models available from International Business Machines Corporation. The PC/XT370, a "desktop" System 370, also available from International Business Machines Corporation, is one example of such a microprocessor implemented main frame. This particular desktop system is a hardware/software package that allows one to run S/370 application programs in a single user environment, to run as a terminal attached to a main frame host or to run in a stand-alone mode, as required by the particular application. There are, of course, similar systems available from other manufacturers, all of which systems incorporate many of the same functions as the PC/XT370 although the manner and means of implementation does differ, in varying degrees, from system to system.

Due to revolutionary advances in chip densities and packaging, which have been accompanied by significant reductions in costs, many main frame features can now be implemented directly in a desktop system, while other features require some hardware and/or software assistance in order to make them available. The introduction and use of more powerful microprocessors such as, for example, the 8086 and 8088 from Intel Corporation and the 68000 from Motorola Corporation, added further to the list of functions it would be possible to implement in a desktop mainframe. This new breed of microprocessors is fully capable of running a large, enriched instruction set, such as that of S/370, although several of these microprocessors working in concert with the aid of additional hardware and/or software support, would be required to effect instruction execution in an acceptable time period.

As in all data processing system designs, various trade-offs are made in order to optimize the price and performance of these desktop mainframes. One particular trade-off problem is posed by the need or desire to utilize certain mainframe functions and features that would be particularly difficult to provide in a microprocessor implemented desktop mainframe. One specific implementation problem of concern is that of accommodating the word and bus width differences between a mainframe central processing unit (CPU) and a microprocessing unit (MPU). In the System 370 world, for example, the system bus will be of multibyte width to accommodate the wider words employed therein. The use of a multibyte width system bus permits the transmission of greater amounts of data and control information in each system cycle which enhances system performance. Usually, one of the plurality of system bus bytes is a command byte, the constituent bits of which are used to indicate, among other things, the type of command to be undertaken by a sub-unit, including memory, that is attached to the bus. Unfortunately, that arrangement of a multibyte width system bus will pose a problem when accommodated in the microprocessor implemented desktop mainframe, since current microprocessors do not have the requisite bus command output information immediately available. That information will, therefore, have to be provided in another manner.

The simplest and possibly most convenient manner of providing command byte information is to write an appropriate command byte to a memory mapped register and then gate this register to the system bus once access thereto is granted. However, implementation of this approach would require an extra cycle in order to write to the command register, after the command byte had been read from memory, each time a command byte was needed for any purpose. That performance penalty would significantly offset the benefits of using a high data transfer rate bus. Thus, while it would be possible to readily accommodate the use of a command byte and multibyte width system bus in a microprocessor implemented desktop main frame, the performance penalty associated with a memory mapped solution thereto is too great to accept.

OBJECTS AND SUMMARY OF THE INVENTION

Accordingly, it is a principal object of the present invention to provide means that will permit a microprocessor based processing system to be interfaced with the multibyte system bus that requires a command byte without undue performance penalty.

It is also a principal oject of the present invention to provide such means whereby the command byte is provided for use on the system bus without requiring additional memory accesses for that purpose alone.

It is a further object of the present invention to provide means for generating a system bus command byte by utilizing the limited information available from microprocessor output control lines to modify preliminary command bytes.

It is another object of the present invention to provide means for generating a system bus command byte using hardware that draws clues about the final command byte required for a desired operation from a preliminary command byte loaded into said hardware.

These and other objects of the present invention are achieved by placing one of a limited number of preliminary bus command bytes into a bus command register and thereafter modifying certain of its bits in accordance with the operation to be performed. Modification of the designated bits of a preliminary bus command byte is accomplished using the limited control information available from the microprocessor controlling I/O operations in bus command generation means supplied for this purpose. The bus command generation means is adapted to automatically pass certain predefined preliminary command bytes through to the system bus without modification. Where byte modification has taken place, a new parity bit is generated for error checking purposes.

BRIEF DESCRIPTION OF THE DRAWINGS

The invention will be described further, by way of a preferred example thereof, with reference to the accompanying drawings wherein like reference numerals have been used in the several views to depict like elements, in which.

DESCRIPTION OF THE PREFERRED EMBODIMENT

The present invention is to be explained in the context of a main frame desktop system that has been implemented, for ease of descriptive purposes, with two microprocessors. It will be understood by those having skill in this art that the main frame implementation could be achieved by use of a greater plurality of microprocessors. Examples of this multiple microprocessor implementation approach are more completely described in commonly assigned U.S. patent application Ser. No. 371,634, filed in the names of Agnew et al on Apr. 26, 1982. In Agnew et al, a System 370 instruction set is partitioned in accordance with several criteria and the subsets thereof are each implemented on one of a plurality of microprocessors.

Figure 1:
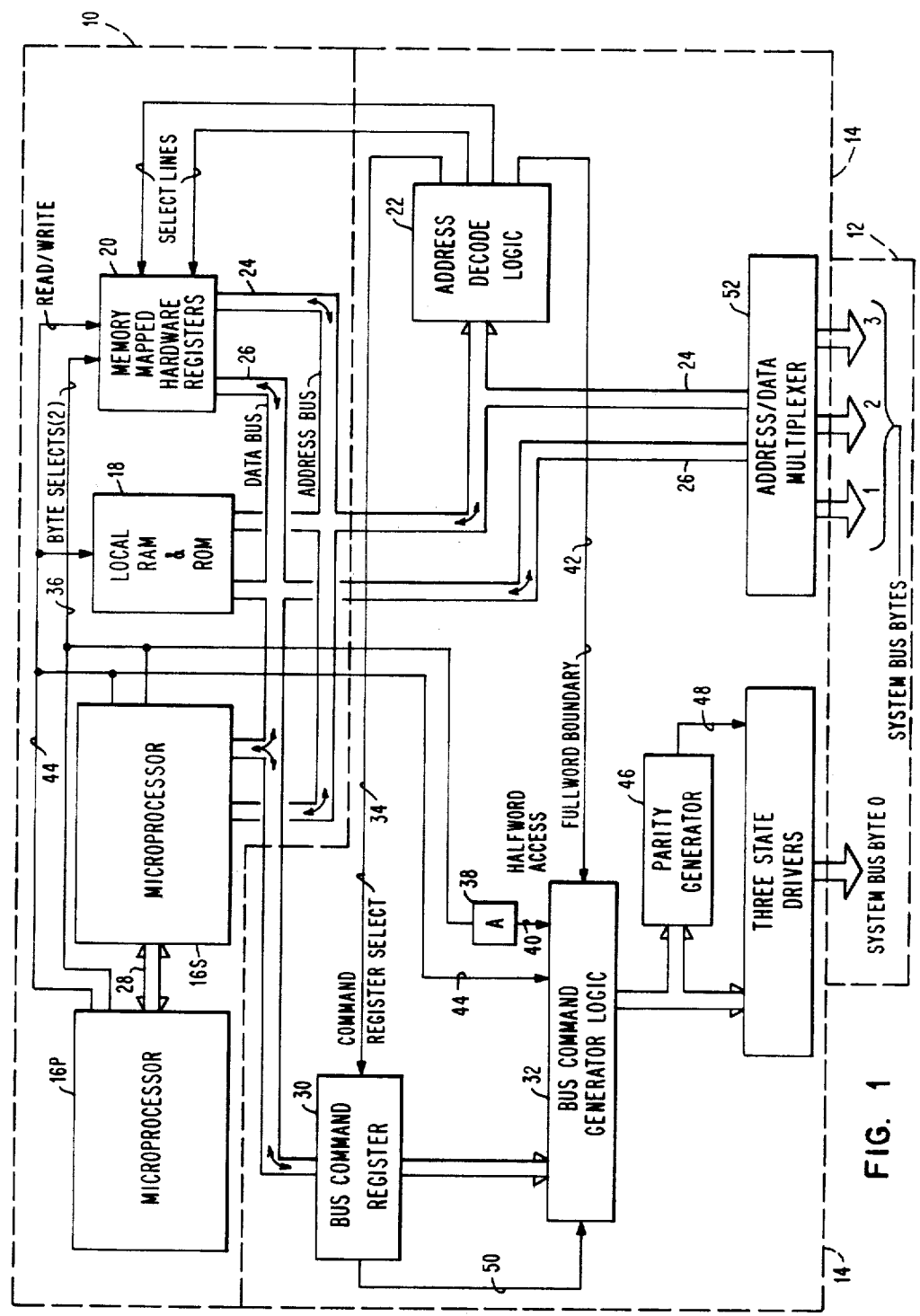
FIG. 1 schematically illustrates a simplified block diagram of the data, address and control information flow paths and processing elements in a microprocessor implemented data processing system, particularly as said microprocessor is interfaced, in accordance with the present invention, to a system bus that requires a command byte.

As illustrated in the information flow path diagram of FIG. 1, a processing unit 10, and its associated microprocessors, storage, hardware registers, address decoding means and control lines, is coupled to a system bus 12 via a system bus interface arrangement 14. The system bus 12 is a multibyte width bus that includes a command byte (byte 0) and three bytes of address information (bytes 1, 2 and 3). The system bus bytes are also employed to carry data at a subsequent time in the bus cycle. Once granted access to the bus 12 by a prioritized bus arbitration scheme, not shown, the interface arrangement 14 loads a one byte bus command onto bus byte 0 and three bytes of address onto bus bytes 1 through 3. It will be appreciated by those having skill in the appertaining arts that any of the many known bus access arbitration schemes will operate satisfactorily for this purpose in conjunction with the interface arrangement 14. This rather typical bus arbiter uses known request/grant protocols and techniques with clock cycles and response times being adjusted to fit the requirements of the particular device chips being used.

The command byte itself has bit significant code points that indicate the type of operation to be performed, e.g., a read or write, the number of operand bytes and any other special information about a particular command. As used herein, particularly in connection with the description of the constituent bits of the bus command byte, bits are numbered in order from most to least significant. Thus, bit 7 will be treated as the most significant bit of a particular byte and bit 0 as the least significant bit thereof. Processing unit 10 includes microprocessors 16$p$ and 16$s$, local read only memory (ROM) and random access memory (RAM) 18, some memory mapped hardware registers 20, address decode logic 22 and the data and address buses 24 and 26 respectively. Microprocessors 16$p$ is a modified, commercially available MPU that has been altered to accommodate microcode that will interpret and respond to the mainframe instruction set, rather than their own native instruction set. Microprocessor 16$s$ is a standard, commercially available MPU that is able to respond to a mainframe instruction set by using code prepared for that purpose which is stored in its control store. Alternatively, although not done in this instance, microprocessor 16$s$ could also be provided with on-chip microcode that responds directly to the mainframe instruction set. Microprocessor 16$p$ acts as a primary MPU and fetches all instructions. However, it cannot host sufficient microcode to accommodate the entire mainframe instruction set. Thus, when it comes across an instruction it is not intended to handle, that instruction is passed on to the secondary microprocessor 16$s$ via the interprocessor bus 28 for eventual execution. The interprocessor bus 28 is used to pass various control signals and information between microprocessors 16$p$ and 16$s$.

The microcode resident in the local ROM 18 associated with microprocessor 16$s$ has been written to conform to and facilitate this partitioned instruction set implementation scheme. Input/output (I/O) functions are among those handled by microprocessor 16$s$. However, like all currently commercially available microprocessors, MPU 16$s$ is not provided with a full command byte output bus, as is a mainframe CPU, although microprocessor 16$s$ does have a number of output control lines that indicate read/write or byte select status, for example. In order to attach the processing unit 10 to the bus 12, some manner of providing the required bus command byte had to be devised. As previously noted, the simplest and most conventional manner of supplying the command byte to the bus 12 is by writing the appropriate command to a memory mapped command byte register and then gating this register to bus 12 once access thereto has been granted. Of course, this methodology would require an extra write cycle to the command byte register each time a new command byte is needed. Given the performance tradeoffs that are made in order to emulate a mainframe instruction set on one or more microprocessors, the additional penalty resulting from the extra write cycles would offset the benefits of using a high transfer rate system bus and would not be acceptable in terms of overall system performance.

To enable use of a multibyte width system bus that includes a command byte in conjunction with a microprocessor implemented data processing system, the interfacing arrangement 14 was developed. This circuitry assists in forming the correct command byte for a particular system action by transferring the contents of a bus command register 30 to bus command generator logic 32 where it is dynamically altered, as required. The resultant "new" command byte is then placed in byte 0 of the system bus 12. The most important aspect of this capability is the lack of need to use an extra write cycle to get information into the bus command register 30. This capability is predicted on the fact that a number of the high usage command bytes have most of their constituent bits in common. Thus, it is possible to modify a common or small set of common preliminary command bytes with the limited control information that is available from microprocessor 16s to produce a number of unique and appropriate bus command bytes. A small number of preliminary bus command bytes are required for that purpose. The types of commands and their associated preliminary and final command bytes are shown in Table I.

TABLE I

| Type of Command | Final Command Byte Required | Prelim. Cmnd. Byte Provided |
| --- | --- | --- |
| Read 1 byte | D2 (11010010) | C2 (11000010) |
| Read 2 bytes | D6 (11010110) | C2 (11000010) |
| Write 1 byte | C2 (11000010) | C2 (11000010) |
| Write 2 bytes | C6 (11000110) | C2 (11000010) |
| Write 2 bytes & val. (forces good ECC ck bits) | C7 (11000111) | C3 (11000011) |
| Read Store Key | B1 (10110001) | A0 (10100000) |
| Write Store Key | A1 (10100001) | A0 (10100000) |
| Communication Cmmnds. | 00 → 7F | 00 → 7F |

Thus, in the case where 1 byte is to be read, a preliminary hex value of C2 is loaded into the bus command register 30 and then gated to the bus command generator logic 32. This preliminary bus command byte is then modified by setting bit 4 thereof, which changes the preliminary byte to a final bus command byte value of hex D2. The final bus command byte is then placed in byte 0 of system bus 12. The read, write and store key bus command bytes are similarly manipulated. As indicated in Table I, and a more detailed explanation thereof will follow, there are instances, such as in the case of a communication command, when the command register byte need not be altered. In those situations, the contents of bus command register 30 are gated directly onto byte 0 of system bus 12. The alteration of the contents of bus command register 30 is accomplished by the bus command register logic 32 which receives the preliminary bus command byte from register 30.

In operation, interface arrangement 14 functions as explained below. Microprocessor 16s and/or local store 18 are provided with microcode that is suitable for the portion of the mainframe instruction set it is to emulate. In order to avoid unnecessary loading of the bus command register 30, the MPU 16p microcode is written so that no request to load a new preliminary bus command byte is issued, once a hex value of C2 has been placed therein and a standard main memory read or write operation is next required. Thus, if a main memory read 1 byte were executed and it was followed by a main memory write 1 byte, this code provision would negate the need to alter the contents of register 30 since the same preliminary bus command byte is used for both instructions. When an instruction is received by microprocessor 16 and it is determined that a new command byte is required for the system bus 12, microprocessor 16s loads the address of the preliminary bus command byte therefor onto address bus 24. The appropriate preliminary bus command byte is then read from local store 18 and gated onto data bus 26. The address and decode logic 22 has, in the interim, conventionally determined from its monitoring of address bus 24 that the data to be next loaded onto data bus 26 should be read into bus command register 30. As a result, the address and decode logic 22 will raise the command register select line 34 to bus command register 30.

This places the preliminary bus command byte in bus command register 30 from where it is forwarded to the bus command generator logic 32. The bus command generator 32 also receives the halfword indicator signal on line 40. The halfword signal is the result of anding the byte select outputs 36 of MPU 16p and MPU 16s in AND gate 38. Also connected to the bus command generator is the fullword boundary indicator select line 42 and the read/write indicator line 44. These signals are utilized to selectively alter certain of the bits of the preliminary bus command byte in accordance with the operation that is to be next executed and the final bus command byte that is needed therefor.

Figure 2:
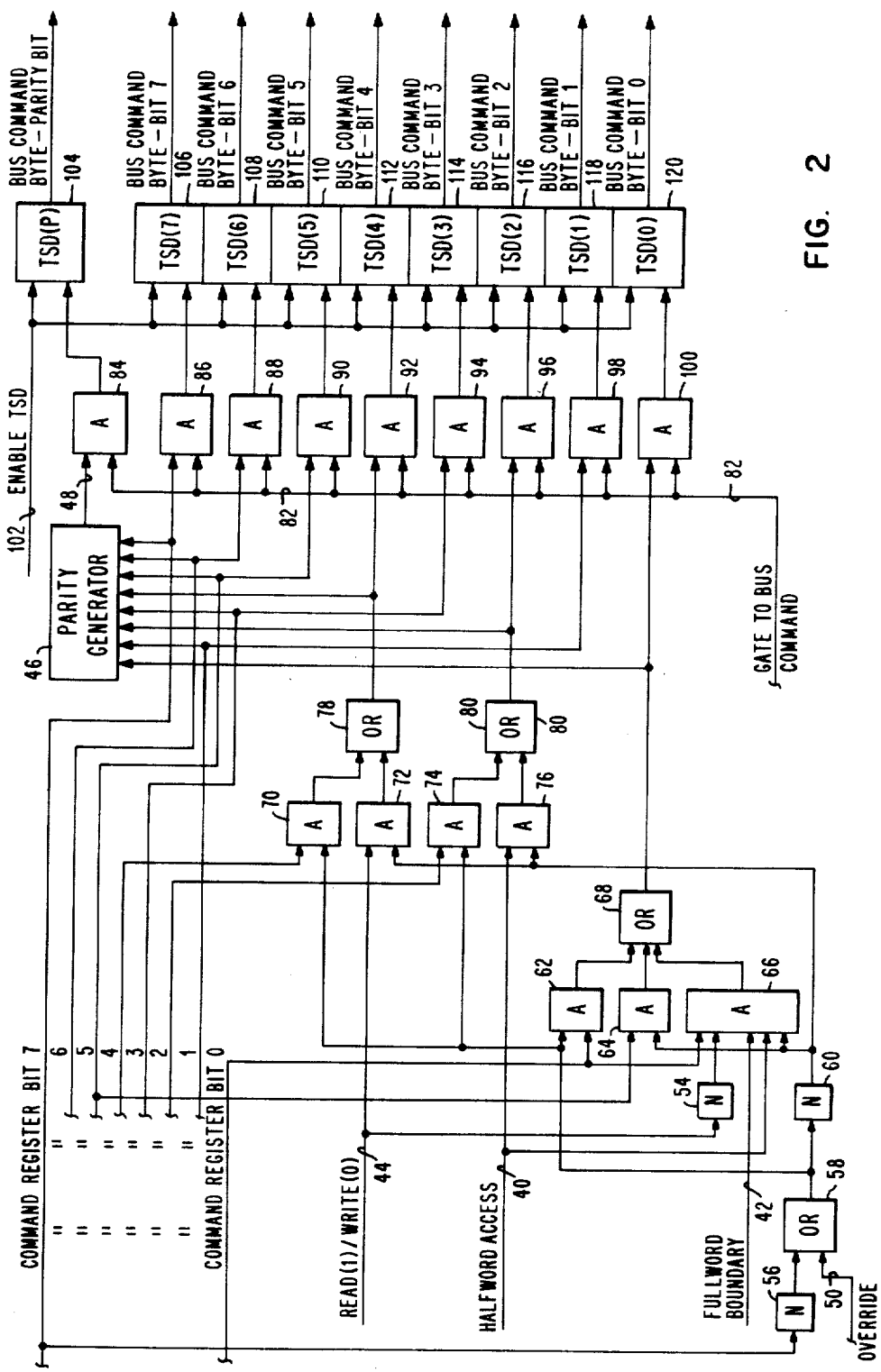
FIG. 2 schematically depicts, in greater detail, an automatic bus command byte generator used in the FIG. 1 interface arrangement.

The bus command generator logic circuitry 32 is shown in greater detail in FIG. 2. As can be seen therefrom, it receives input from the bus command register 30 (bits 7 through 0 thereof), halfword access line 40, fullword boundary line 42, read/write line 44 and an override line 50. The information on override line 50, like the preliminary command byte, is derived from the bus command register 30. It is, in effect, a ninth bit of information that is loaded with the preliminary command byte into register 30. The bus command generator logic circuitry 32 also receives input signals on its gate to bus command byte line 82 and its enable TSD drivers line 102. Parity generator 46 is shown in FIG. 2, but plays no role in the formation of the final bus command byte except for generating a new parity but as may be required for each new bus command byte that is gated onto system bus 12. The new parity bit is forwarded from output line 48 of parity generator 46 to bus AND gate 84 from whence it is gated to bus 12 via the TSD driver 104 as shall hereinafter be explained.

Bits 7, 6, 5, 3 and 1 of the bus command byte are all forwarded directly to the bus AND gates 86, 88, 90, 94, and 98 and are not operated on or altered by logic circuit 32, although the status of bits 5 and 7 may be utilized to amend the states of bits 4, 2 and/or 0. Bits 7, 6, 5, 3 and 1 are duplicated for use by the parity generator 46. The "clues" available to the bus command generator logic circuitry 32, on which modification of a preliminary command byte is based, are drawn from the status of bits 7, 5, 4, 2 and 0 and of the halfword access, fullword boundary, read/write and override input lines. As will be recalled from Table I, a normal memory read/write instruction requires a preliminary bus command byte of C2. Hex values of C2, C6, D2 and D6 are to be produced from this C2 preliminary value for the write 1 byte, write 2 bytes, read 1 byte and read 2 bytes commands, respectively. It should be noted that the preliminary bus command byte C2 can be changed to any one of these four final bus command bytes by altering only bits 4 and 2 thereof.

The primary concern, for these four command situations, is the status of the halfword access line 40 and the read/write line 44. AND gates 70 and 72 control the status of bit 4 of the final bus command byte. They operate in a mutually exclusive fashion as a function of the status of bit 7 of the preliminary bus command byte. If bit 7 is on, and it always will be for hex values greater than 7F, the output of inverter 56 is set to a logical 0. In the absence of an override signal on line 50, that condition holds the the output of OR gate 58 at a logical 0. This means that one input line to AND gate 70 is set to 0 and an input line to AND gate 72 is set to a logical 1 as a result of negation by inverter 60. Thus, if bit 7 of the preliminary bus command byte is on, the output of AND gate 70 will always be held at a logical 0. The other input to AND gate 70 is bit 4 of the preliminary bus command byte. If it is on, then the output of AND gate 70 is set to a logical 1. If bit 4 is originally at a logical 0, the actual case for all of the non-communication command bytes, the output of AND gate 70 will be at a logical 0. The output of AND gate 72 is a function of the status of its two inputs, read/write line 44 and bit 7 of the preliminary command byte. If read/write line 44 is at a logical 1 and bit 7 of the preliminary command byte is at a logical 1, inverter 60 has set the second input to a logical 1, the output of AND gate 72 will be set to a logical 1. This, in turn sets the output of the bit 4 OR gate 78 to a logical 1.

The function of AND gates 74 and 76 is similar to that of gates 70 and 72. The output of AND gate 74 is kept at a logical 0 whenever bit 7 of the preliminary bus command byte is at a logical 1 and no override signal is present. AND gate 76 responds to the status of bit 7 of the preliminary bus command byte and of the halfword access line 40. If both are logical 1s, the output of the bit 2 OR gate 80 will be at a logical 1, otherwise it will be at a logical 0 if either input is 0.

As a result of the bit 4 and bit 2 manipulations by AND gates 70, 72, 74 and 76 in response to their respective inputs, the preliminary bus command byte C2 can be transformed into a final bus command byte of C6, D2, D6 or left as is. AND gates 70 and 72 determine the final status of the most significant nibble of the bus command byte while AND gates 74 and 76 affect the status of the least significant nibble thereof. Further, if a preliminary bus command byte of A0 is employed, when a read or write store key op is to be executed, AND gates 70 and 72 can still be used to toggle bit 4 of the final bus command byte to the desired state so that the most significant nibble of the final bus command will be either a hex A or B, depending on whether a read or write store key is to be performed.

The manipulation of bit 0 of the preliminary bus command byte is somewhat similar to that of bits 4 and 2, but involves some additional considerations. Bit 0 of the final bus command byte needs to be set to a logical 1 in order to obtain the proper final bus command byte for the two store key instructions and for a write 2 bytes with validation instruction. That manipulation is handled by the combined action of the respective inputs to AND gates 62, 64 and 66. In the absence of an override signal, any non-communication command in the bus command register 30, meaning bit 7 thereof is set to a logical 1, sets the output of AND gate 62 to a logical 0. The output of AND gate 64 is controlled by the status of bits 7 and 5 of the preliminary bus command byte. If both were logical 1s, then the output of AND gate 64 is set to a logical 1, otherwise it is a logical 0. If bit 5 of the preliminary command byte is a logical 1, it means that the preliminary command byte must have been a hex value A0 and that bit 0 of the final bus command byte needs to be a logical 1. The action of AND gate 64 fulfills this requirement. AND gate 66 responds to the status of the halfword access line 40, the status of the fullword boundary line 42, the status of the read/write line 44, as negated by inverter 54, and the status of bits 7 and 0 of the preliminary bus command byte. The action of this gate insures that a preliminary bus command byte hex value of C3 is converted, insofar as the final status of bit 0 only is concerned, to a C7. The output lines of AND gates 62, 64 and 66 all serve as inputs for the bit 0 OR gate 68. It should be noted that the outputs of OR gates 68, 78 and 80 are directed to the parity generator 46, as were bits 7, 6, 5, 3 and 1 of the preliminary bus command byte.

Any communication commands, hex values 00 to 7F, indicate a message transfer to a non-memory sub-unit that is attached to the system bus 12. When loaded into bus command register 30, these command bytes all cause bit 7 of register 30 to be set to a logical 0. When bit 7 of the command register 30 is at a logical 0, AND gates 62, 70 and 74 will gate through the actual command register values of bits 0, 4 and 2, respectively, to OR gates 68, 78 and 80. It may also be necessary or desirable to issue a special system bus command, such as override or a diagnostic, which are not as performance critical as the high usage commands. By setting bit 7 of bus command register 30 to a logical 0 or by issuing an override signal on line 50, any byte in command register 30 will be gated straight through logic circuit 32, unchanged, to the system bus 12. It will be noted that setting bit 7 of command register 30 to a logical 0 or setting override line 50 to a logical 1 causes the output of OR gate 58 to be set to a logical 1. This enables AND gates 62, 70 and 74, allowing bits 0, 2 and 4 of command register 30's contents to be gated onto system bus 12.

All original bits of the preliminary bus command byte and any altered bits in substitution thereof are each forwarded to bus gating AND gate 84 through 100, respectively. Upon receipt of a gate to bus command on line 82, the eight bit final bus command byte and an associated parity bit therefor are each sent to tri-state drivers (TSD) 104 through 120, respectively. The final bus command byte is then gated onto the system bus 12 by an enable TSD signal on line 102. In this manner, either an appropriate bus command byte is placed on the system bus within the need for an additional memory access to obtain that command.

Although the present invention has been described in the context of a preferred embodiment thereof, it will be readily apparent to those skilled in the appertaining art, that modifications and variations can be made therein without departing from its spirit and scope. Accordingly, it is not intended that the present invention be limited to the specifics of the foregoing description of the preferred embodiment. Instead, the present invention should be considered as being limited solely by the appended claims, which alone are intended to define its scope.

Having thus described our invention, what we claim as new and desire to secure by Letters Patent, is as follows:

1. Apparatus for generating a system bus command byte from a processing unit of a microprocessor implemented data processing system in response to a set of informaion, said set of information including a set of preliminary bus command bytes having predetermined command significant bits and a set control information, said control information being supplied by said microprocessor and said bus command bytes being supplied by a storage means and representing clues relating to the type of operation to be performed by a mainframe computer, said microprocessing unit interfacing with a multibyte width system bus of said mainframe computer which requires said bus command byte, said microprocessor being incapable of supplying said bus command byte, said apparatus comprising:

storage means for storing said set of preliminary bus command byte therein;

bus command register means connected to said storage means for storing one of said set of preliminary bus command bytes therein;

decoding means, connected to said microprocessor, said storage means and said bus command register means for receiving a storage address of the preliminary bus command byte to be stored in said bus command register means and for gating said preliminary bus command byte from said storage means into said bus command register means in response thereto, and logic circuit means, connected to an output of said bus command register means and said microprocessor and responsive to the preliminary bus command byte stored in said bus command register means and to said control information supplied from said microprocessor for changing at least one of the command significant bits of said preliminary bus command byte in accordance with said control information thereby developing said system bus command byte required by said multibyte width system bus, said logic circuit means placing said system bus command byte on said system bus.

2. The apparatus according to claim 1, further comprising parity generating means, connected between said logic circuit means and said system bus, for generating a new parity bit in response to said preliminary bus command byte, said system bus command byte and said new parity bit being placed on said system bus by said logic circuit means.

3. The apparatus according to claim 2 wherein said logic circuit means includes circuit means, responsive to at least one predetermined bit of said preliminary bus command byte, for passing said preliminary bus command byte unchanged through said logic circuit means to said system bus when the status of said predetermined bit indicates that no bit changes should be made to the bits of said preliminary bus command byte.

4. The apparatus according to claim 3 wherein:
(a) said storage means stores therein a non-preliminary bus command information bit that indicates whether a preliminary command byte should be modified before being placed on said system bus;
(b) said bus command register means is adapted to accept and store said non-preliminary bus command byte information bit therein in addition to said preliminary bus command byte;
(c) said decoding means is connected to also receive the storage address of said non-preliminary bus command information bit and to gate said bit from said storage means to said bus command register means; and
(d) said logic means further includes circuit means, responsive to the status of said non-preliminary command byte information bit for passing said preliminary bus command byte unchanged through said logic circuit means to said system bus in accordance with the status of said non-preliminary bus command information bit.

5. The apparatus according to claim 2 wherein:
(a) said storage means stores therein a non-preliminary bus command information bit that indicates whether a preliminary command byte should be modified before being placed on said system bus;
(b) said bus command register means is adapted to accept and store said non-preliminary bus command byte information bit therein in addition to said preliminary bus command byte;
(c) said decoding means is connected to also receive the storage address of said non-preliminary bus command information bit and to gate said bit from said storage means to said bus command register means; and
(d) said logic means further includes circuit means, responsive to the status of said non-preliminary command byte information bit for passing said preliminary bus command byte unchanged through said logic circuit means to said system bus in accordance with the status of said non-preliminary bus command information bit.

6. The apparatus according to claim 1 wherein said logic circuit means includes circuit means, responsive to at least one predetermined bit of said preliminary bus command byte, for passing said preliminary bus command byte unchanged through said logic circuit means to said system bus when the status of said predetermined bit indicates that no bit changes should be made to the bits of said preliminary bus command byte.

7. The apparatus according to claim 6 wherein:
(a) said storage means stores therein a non-preliminary bus command information bit that indicates whether a preliminary command byte should be modified before being placed on said system bus;
(b) said bus command register means is adapted to accept and store said non-preliminary bus command byte information bit therein in addition to said preliminary bus command byte;
(c) said decoding means is connected to also receive the storage address of said non-preliminary bus command information bit and to gate said bit from said storage means to said bus command register means; and
(d) said logic means further includes circuit means, responsive to the status of said non-preliminary command byte information bit for passing said preliminary bus command byte unchanged through said logic circuit means to said system bus in accordance with the status of said non-preliminary bus command information bit.

8. The apparatus according to claim 1 wherein:
(a) said storage means further accommodates and stores therein a non-preliminary bus command information bit that indicates whether a preliminary command byte should be modified before being placed on said system bus;
(b) said bus command register means is adapted to accept and store said non-preliminary bus command byte information bit therein in addition to said preliminary bus command byte;
(c) said decoding means is connected to also receive the storage address of said non-preliminary bus command information bit and to gate said bit from said storage means to said bus command register means; and
(d) said logic circuit means further includes circuit means, responsive to the status of said non-preliminary command byte information bit for passing said preliminary bus command byte unchanged through said logic circuit means to said system bus in accordance with the status of said non-preliminary bus command information bit.

* * * * *